United States Patent [19]
Hansen

[11] 3,970,282
[45] July 20, 1976

[54] MAGNETIC VALVE

[75] Inventor: Egon Jorgen Hansen, Sonderborg, Denmark

[73] Assignee: Danfoss A/S, Nordborg, Denmark

[22] Filed: Dec. 9, 1974

[21] Appl. No.: 530,706

[30] Foreign Application Priority Data
Dec. 10, 1973 Germany............................ 2361398

[52] U.S. Cl............................... 251/129; 251/30
[51] Int. Cl.² ........................................ F16K 31/06
[58] Field of Search ................. 251/129, 77, 30, 138

[56] References Cited
UNITED STATES PATENTS

| | | | |
|---|---|---|---|
| 2,622,618 | 12/1952 | Ghormley | 251/30 |
| 3,108,777 | 10/1963 | Ray | 251/129 X |
| 3,154,285 | 10/1964 | Houle | 251/30 |
| 3,707,992 | 1/1973 | Ellison et al. | 251/129 X |

Primary Examiner—Arnold Rosenthal

[57] ABSTRACT

The invention relates to a magnetic valve assembly of the type in which an energized armature moves a valve closure member to an open position and a load spring in compression maintains the valve closure member closed when the armature is nonenergized. Relative movement between the armature member and the closure member is provided and an energy storing spring between these members resists the relative movement. In two embodiments the energy storing spring is stressed in compression in one and in tension in the other. The valve closure member does not begin to move until the armature causes the energy storing spring to be stressed to an extent equal to a predetermined stressing of the load spring. With this mode of operation the armature stroke is longer than the stroke of the closure member and this results in a smaller magnetic system being sufficient for a given valve system.

2 Claims, 3 Drawing Figures

MAGNETIC VALVE

The invention relates to a magnetic valve, the closing member of which is movable by the armature against the force of a pre-stressed loading spring from one end position, in particular the closing position, into the other end position.

In a known magnetic valve, the closing member is secured directly in the armature. The loading spring engages the armature, likewise directly. A particular size of electromagnet is necessary for a specific pre-stressing of the loading spring and with a given pressure of the medium and a given armature stroke. Since the magnetic force diminishes as the distance of the armature from the magnet core increases, relatively strong electro-magnets are necessary in order to enable a valve having a specific stroke and a specific closing force of its loading spring to be actuated.

Magnetic valves are also known in which a plurality of springs are used in order to load the closing member, secured in the armature, with a spring force, the characteristic curve of which is matched to that of the magnetic force. In this arrangement, a loading spring applying relatively small bias acts in one of the end positions. Near the other end position, this spring is replaced or reinforced by a further loading spring. This latter spring performs the function of pulling the armature away from the core in a reliable manner when the electro-magnet is de-energized.

The object of the invention is to provide a magnetic valve of the initially described kind in which a smaller magnet system suffices for a given pre-stressing of the loading spring and a given armature stroke.

According to the invention, this object is achieved in that an energy-storing spring is fitted between the armature and the closing member, which spring, during the first part of the stroke of the armature, is adapted to be stressed to a force value which exceeds the force holding the closing member in the end position.

In this construction, only the energy-storing spring is gradually stressed at the beginning of the stroke of the armature, i.e. when the magnetic force is still low. As the magnetic force rises and the stress of the energy-storing spring is accordingly increased, the point is finally reached at which the force holding the closing member in the end position is overcome. In a normally closed valve, this holding force is composed of the bias applied by the loading spring and that force that is obtained from the product of the cross-section of the valve seat and the pressure-difference at the valve. The entire arrangement, consisting of the armature, the energy-storing spring and the closing member, then moves into the other end position and in so doing overcomes the force of the loading spring. This permits operations using a very much smaller magnet system.

In a preferred embodiment, the loading spring is supported by the housing and extends, at least partially, through the armature. In this arrangement a relatively long loading spring is obtained which, after its bias has been overcome, also permits a correspondingly long stroke of the closing member.

Furthermore, the energy-storing spring may engage a collar on the exterior of the closing member and a shoulder within the armature. In this arrangement the spring may be either a tension spring or a compression spring.

In a preferred construction, the closing member is a needle with an exterior flange, the armature has a stepped bore, with an internal flange inserted at the end of that portion of the bore of greater cross-section, the loading spring is guided by that portion of the bore of smaller cross-section and is supported on the end of the needle, and the energy-storing spring is disposed in that portion of the bore of greater cross-section and is supported at one end on the exterior flange and at the other end on the internal flange. This arrangement results in a construction which is very compact both in the axial and radial directions.

The magnetic valve of the invention may take any one of a wide variety of forms. In particular, large gaps can be overcome with small magnetic forces. The magnetic valve is therefore particularly suitable as a pilot-controlled valve in which the pilot nozzle is fitted directly on a servo-diaphragm or on a servo-piston.

The invention will now be described by reference to forms of construction illustrated in detail in the drawing, in which.

Figure 1:
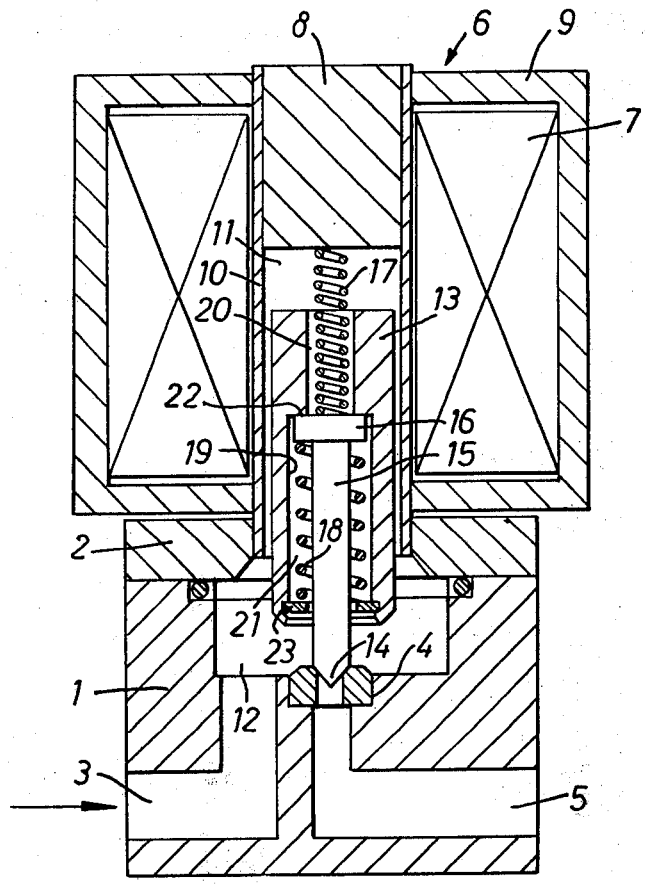
FIG. 1 is a longitudinal section through a first embodiment of the invention.

FIG. 1 illustrates a valve housing 1 with a cover 2. An inlet port 3 leads via a valve seat 4 to an outlet port 5. A magnet attachment 6 has a magnet winding 7, a magnet core 8, a magnetic path 9 and a bush 10 made of non-magnetic material. The interior 11 of this bush communicates with the valve chamber 12.

Also provided are an armature 13, a closing member 14, consisting of a needle 15 and a flange 16 on the needle, a loading spring 17 and an energy-storing spring 18. The armature has a bore 19 consisting of a portion 20 of smaller diameter and of a portion 21 of greater diameter, these portions joining each other through a stepped part 22. The loading spring 17 is under a specific pre-stressing and is supported at one end on the magnetic core 8 and on the other on the upper end of the needle 15; part of the spring extends through that portion 20 of the bore of smaller cross-section. The energy-storing spring 18 fitted in that portion 21 of the bore of greater cross-section is supported at one end on the flange 16 and at the other on an internal flange 23 fitted in the armature 13. Therefore, in the illustrated position the armature presses against the flange 16 through its stepped part 22, whereas the loading spring 17 presses the closing member 14 against the valve seat 4.

Figure 3:
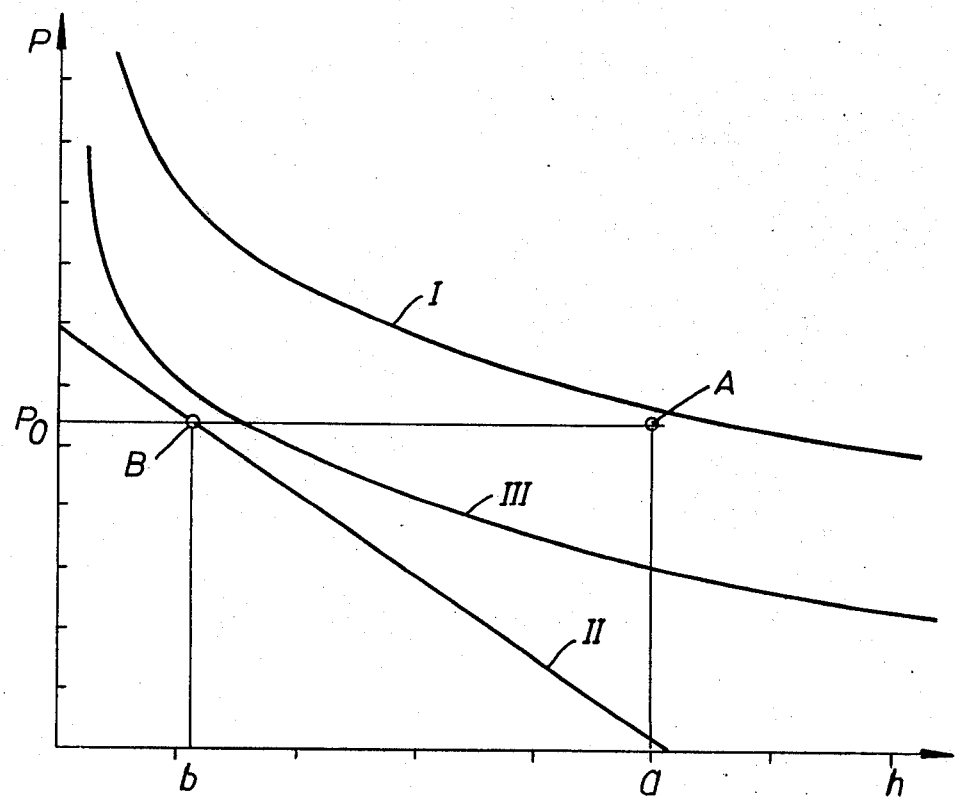
FIG. 3 shows a graph in which forces are plotted against stroke.

To explain the mode of operation, reference will now be made to FIG. 3. Therein the force P is plotted against length of stroke h. The force Po in the illustrated rest position results from the pre-stressing of the loading spring 17 having a length $a$ and the force applied by the pressure of the medium to the uncovered cross-section of the valve seat 4. The point A can be found in this way. If it were required to overcome this force Po by means of a known magnet system, the magnet would need to be so designed that it had a characteristic curve I.

In the magnetic valve of the invention, the closing member 14 and the loading spring 17 initially remain stationary when the electro-magnet is energized. Only the energy-storing spring 18 is stressed by the armature along the characteristic curve II. This intersects the curve for the force Po at the point B. The entire arrangement then continues to move and in so doing overcomes the force of the loading spring 17. It is clear that a magnetic force curve III, which requires a very much smaller magnet system, suffices for this purpose. Since, at the moment at which it starts to drive the closing member, the armature has a momentum corresponding to its velocity, the lifting of the closing member is facilitated still further.

In this construction the stroke of the armature is greater than the stroke of the closing member. No difficulties arise in making the stroke of the closing member sufficiently great when the stroke of the armature is of a given length. A particular advantage resides in the fact that, because the stroke of the armature is great in relation to that of the valve, large tolerances can be accepted when designing the magnet system.

Figure 2:
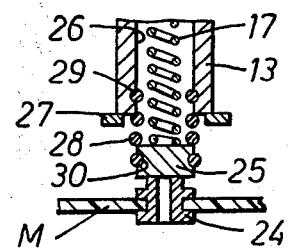
FIG. 2 shows a detail of a second embodiment of the invention.

In the arrangement shown in FIG. 2, a nozzle 24, which also functions as a valve seat, is inserted in a diaphragm M of a pilot-controlled valve. The closing member 25 is loaded by the loading spring 17. The armature has a continuous bore 26 and comes to rest on abutments 27 integral with the housing. A tension spring 28 is used as the energy-storing spring and is fitted in suitable locating grooves 29 and 30 formed respectively in the armature and the closing member. The mode of operation of this valve is the same as that of the valve shown in FIG. 1.

I claim:

1. A magnetic valve assembly comprising casing means, a valve seat and a linearly movable closure member cooperable with said seat, an armature member connected to said closure member having an energized valve open position and a nonenergized valve closed position, a load spring having one end fixed relative to said casing for biasing said closure member to a closed position, said loan spring having a constant predetermined stress when said closure member is in its closed and open position, energy storing spring means between said closure member and said armature member resiliently resisting relative movement between said members, said load spring being stiffer than said energy storing spring means, said energy storing spring means being stressed to an extent equal to said predetermined stress prior to said armature member reaching the energized end of its stroke, said armature member having a stepped central bore forming a counter, said closure member entering said bore from one end and engaging said counter, said load spring entering said bore from the other end and engaging said closure member.

2. A magnetic valve assembly according to claim 1, wherein said energy storing spring is stressed in compression.

* * * * *